(12) United States Patent
Matsuhisa

(10) Patent No.: US 9,778,437 B2
(45) Date of Patent: Oct. 3, 2017

(54) LENS DRIVING DEVICE

(71) Applicant: Nidec Copal Corporation, Tokyo (JP)

(72) Inventor: Haruka Matsuhisa, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 138 days.

(21) Appl. No.: 14/747,240

(22) Filed: Jun. 23, 2015

(65) Prior Publication Data

US 2016/0018623 A1    Jan. 21, 2016

(30) Foreign Application Priority Data

Jun. 30, 2014  (JP) ................................ 2014-135437

(51) Int. Cl.
| | | |
|---|---|---|
| *G02B 7/02* | (2006.01) | |
| *G02B 7/10* | (2006.01) | |
| *H02K 41/035* | (2006.01) | |
| *G03B 3/10* | (2006.01) | |

(52) U.S. Cl.
CPC .............. *G02B 7/102* (2013.01); *G03B 3/10* (2013.01); *H02K 41/0356* (2013.01)

(58) Field of Classification Search
CPC .......... G02B 7/102; G02B 7/023; G02B 7/04; G02B 7/09; G03B 3/10
See application file for complete search history.

(56) References Cited

U.S. PATENT DOCUMENTS

| | | | | |
|---|---|---|---|---|
| 8,818,181 | B1 * | 8/2014 | Hwang | ................ H04N 5/2254 324/207.2 |
| 9,013,588 | B2 | 4/2015 | Moriya et al. | |
| 2012/0154614 | A1 | 6/2012 | Moriya et al. | |

FOREIGN PATENT DOCUMENTS

JP    2011-065140 A    3/2011

* cited by examiner

*Primary Examiner* — Joseph P Martinez
(74) *Attorney, Agent, or Firm* — Troutman Sanders LLP

(57) ABSTRACT

A lens driving device includes: a lens frame; a supporting unit that supports the lens frame in driving directions; a driving unit that drives the lens frame in one or both of a direction of an optical axis and a direction intersecting the optical axis; and a sensor that is mounted on the supporting unit and detects a position of the lens frame. The supporting unit includes: a circuit that is connectable to the sensor and integral with the supporting unit; and a recess that receives the sensor. The circuit has terminals exposed to a space inside the recess.

7 Claims, 5 Drawing Sheets

LENS DRIVING DEVICE

CROSS REFERENCE TO RELATED APPLICATION

This application claims priority under 35 U.S.C. §119 to Japanese Patent Application No. 2014-135437,. filed on Jun. 30, 2014, the entire content of which being hereby incorporated herein by reference.

TECHNICAL FIELD

The present invention relates to a lens driving device.

BACKGROUND

A lens driving device comprising an electromagnetic driving unit having a coil and a magnet is known. Such a lens driving device includes an autofocus lens driving unit that drives a lens frame along an optical axis and an image stabilizing lens driving unit that drives the lens frame in directions intersecting the optical axis. Camera described in, for example, Japanese Patent 2011-65140 includes a driving device for auto focus and a driving device for image stabilization.

This lens driving device comprises a position detection sensor that detects the position of a driven lens frame. Therefore this lens driving device can perform a feedback control of driving of the lens frame based on an output from the position detection sensor. The position detection sensor includes a hall sensor etc., the hall sensor moves together with the lens frame and detects magnetic field of a magnet which is a part of the driving unit.

In a conventional lens driving device comprising a position detecting sensor, the position detection sensor is mounted on a flexible substrate, and terminals of the flexible substrate are connected to the terminal on the support member. However, such connection through the intermediary of a flexible substrate tends to incur summing of a positional deviation caused when mounting the position detection sensor on the flexible substrate and a positional deviation caused when connecting the flexible substrate to the terminals on the support member. Therefore, mounting the position detection sensor with high positional accuracy requires a high level of skill and a careful work. Also, as the flexible substrate need to be manufactured with high dimensional accuracy, there was a problem that the manufacturing cost is raised.

Also, the distance between the detection object (magnet etc.) and the position detection sensor tends to vary due to the presence of the intermediate flexible substrate. Therefore, for achieving a high level of detection accuracy through highly accurate control of the distance, a high level of production control is necessary. In addition, since the thickness of the flexible substrate and thickness of the position sensor are summed on the support member, the distance from the surface of the support member to the lens frame has to be increased to some extent. Therefore, a problem remains unsolved that hampers reduction in the size and/or thickness of the lens driving device.

The present invention addresses, for example, such a problem. Further, the present invention has the following aspects: that the position detection sensors for feedback control of driving of lens frame can easily be mounted at low cost and high positional accuracy; that high position detection accuracy can be accomplished without requiring a high level production control; and that a reduction in the size and/or thickness of the lens driving device can be accomplished by decreasing the distance between the support member and the lens frame as much as possible.

SUMMARY

To provide such aspects, the lens driving device according to the present invention has the following configuration.

The lens driving device includes: a lens frame; a supporting unit that supports the lens frame in driving directions; a driving unit that drives the lens frame in one or both of a direction of an optical axis and a direction intersecting the optical axis; and a sensor that is mounted on the supporting unit and detects position of the lens frame. The supporting unit includes a circuit that is to be connected to the sensor and integral with the supporting unit, and a recess for receiving the sensor. The circuit has terminals exposed to the space inside the recess.

BRIEF DESCRIPTION OF THE DRAWINGS

FIGS. 2(a) and 2(b) are views of a structure of the example of the present invention, in which FIG. 2(a) is a plan view, and FIG. 2(b) is a sectional view taken along line X-X of FIG. 2(a).

FIGS. 3(a) and 3(b) are views of a base supporting member of the lens driving device according to the example of the present invention, in which FIG. 3(a) is a plan view, and FIG. 3(b) is a rear view.

FIGS. 5 (a) and 5(b) are a view of an electronic device including the lens driving device according to the example of the present invention, in which FIG. 5(a) shows a camera, and FIG. 5(b) shows a personal digital assistant.

DETAILED DESCRIPTION

Figure 1:
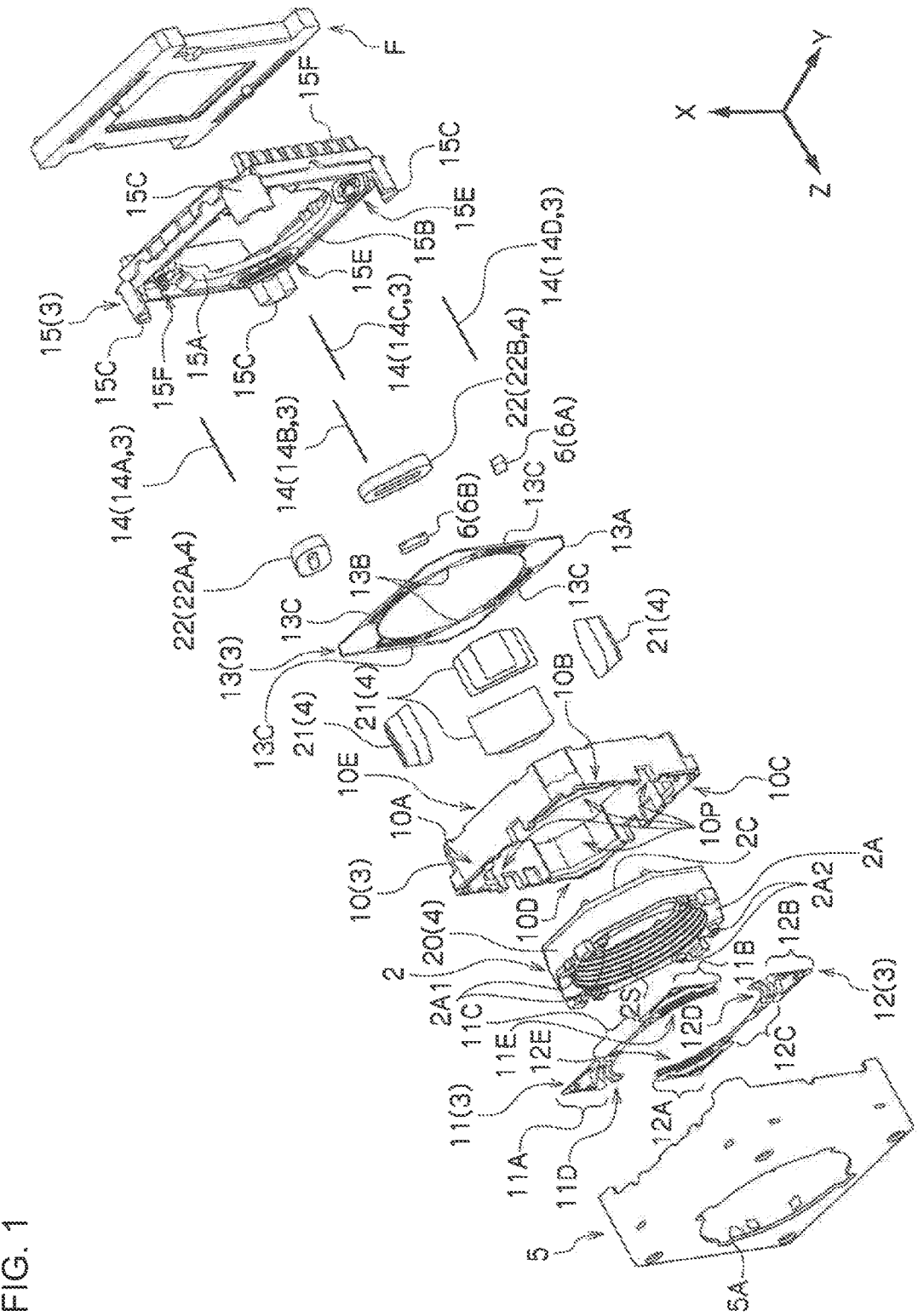
FIG. 1 is an exploded perspective view of the lens driving device according to an example of the present invention.
Figure 2:
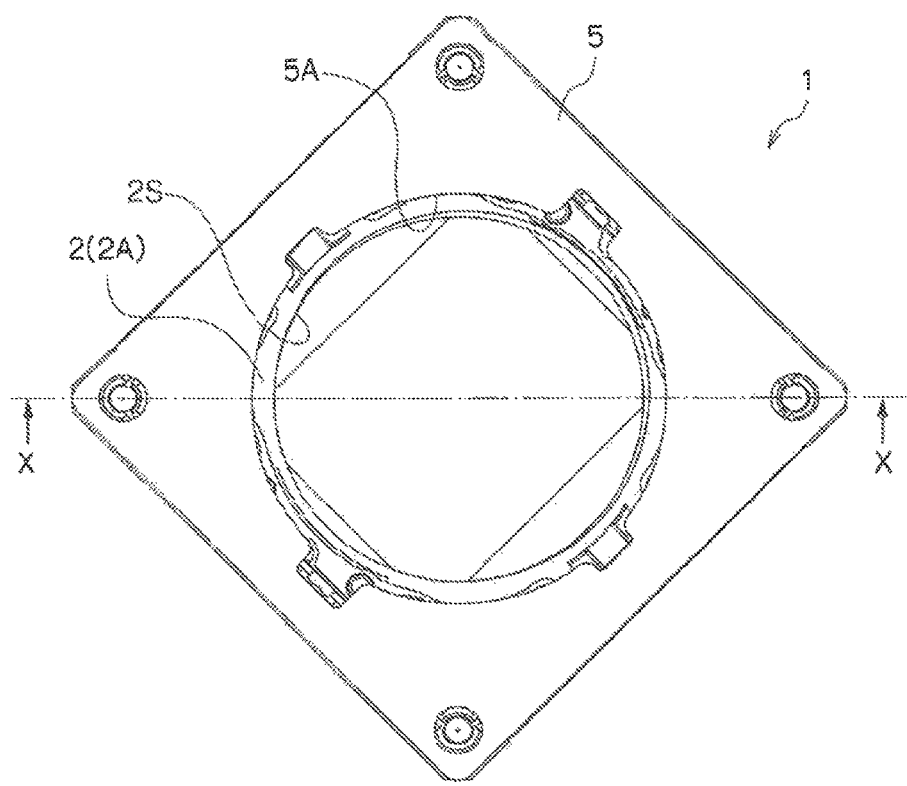
Figure 2:
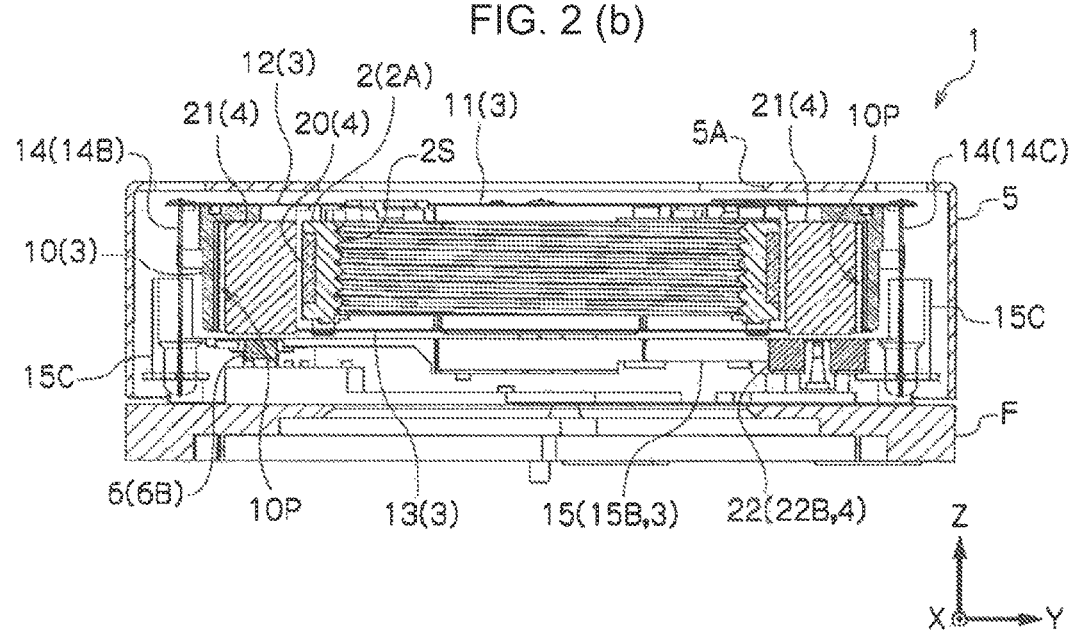

Hereinafter, examples of the present invention will be described with reference to the drawings. FIG. 1 is an exploded perspective view of a lens driving device according to an example of the present invention. FIG. 2 is a view of whole structure according to the example of the present invention, wherein FIG. 2(a) is a plan view, and FIG. 2(b) is a sectional view taken along line X-X of FIG. 2(a).

A lens driving device 1 has a lens frame 2, a supporting unit 3, and a driving unit 4. The lens frame 2 has a lens barrel mounting opening 2S for mounting a lens barrel (not shown in the drawings). Central axis of the lens barrel mounting opening 2S coincides with the optical axis of a lens. Hereafter, the object side of the lens is referred to as "front side", and the images side of lens is referred to as "rear side". In the drawings, optical axis directions are shown by Z, and directions that intersect the optical axis are shown by X and Y.

A driving unit 4 drives the lens frame 2 in one or both of directions of the optical axis and the directions intersecting the optical axis. An example shown in the drawings has both an autofocus driving unit that performs driving in the directions of the optical axis and an image stabilization driving unit that performs driving in directions intersecting the optical axis. However, the present invention is not limited to this example, and the present invention includes examples having only the autofocus driving unit or an image stabilization driving unit. In the example shown in the drawings, the driving unit 4 has a focus coil 20 that is wound on a body portion of the lens frame 2 so as to surround the optical axis, four magnets 21 placed around the lens frame 2, and image stabilization correction coils 22(22A, 22B) which are placed behind each pair of magnets, of the four magnets, whose magnetic fields orthogonally cross each other.

The supporting unit 3 resiliently supports the lens frame 2 in the direction of the driving performed by the driving unit 4. The position of the lens frame 2 is controlled by the balance between the thrust produced by the driving unit 4 and the resilient force of the supporting unit 3. In the illustrated example, the lens frame 2 is resiliently supported both in the directions of the optical axis and the directions intersecting the optical axis. However, the present invention is not limited to this example, and the present invention includes examples in which the lens frame 2 is resiliently supported only in the directions of the optical axis.

In the illustrated example, the supporting unit 3 has a movable supporting member 10, front-side springs (flat spring) 11,12, a rear-side spring (flat spring) 13, supporting wires 14, and a base supporting member 15. The movable supporting member 10 surrounds and resiliently supports the lens frame 2 in the directions of the optical axis so as to encompass the optical axis, and is resiliently supported in the directions intersecting the optical axis. The movable supporting member 10 shown in the drawings has a rectangular shape with corners surrounding the optical axis, and the corners serve as magnet holders 10P for holding the magnets 21.

Outer mounting parts 11A, 11B of the front-side spring 11 are mounted on front end mounting parts 10A, 10B of the movable supporting member 10. An inner mounting part 11C of the front-side spring 11 is mounted on a front mounting part 2A1 of the front surface 2A of the lens frame 2. Outer mounting parts 12B, 12A of the front-side spring 12 are mounted on front end mounting parts 10C, 10D of the movable supporting member 10.

An inner mounting part 12C of the front-side spring 12 is mounted on a front mounting part 2A2 of the front surface 2A of the lens frame 2. The front-side spring 11 has resilient portions 11D, 11E between the outer mounting parts 11A, 11B and the inner mounting part 11C, and the front-side spring 12 has resilient portions 12E, 12D between the outer mounting parts 12A, 12B and inner mounting part 12C.

An outer mounting part 13A of the rear-side spring 13 is mounted on a rear-end mounting part 10E of the movable supporting member 10. An inner mounting part 13B of the rear-side spring 13 is mounted on a rear-end mounting part 2C of the rear surface of the lens frame 2. The rear-side spring 13 has a resilient portion 13C between the outer mounting part 13A and the inner mounting part 13B.

The lens frame 2 is supported at its front side by a front portion of the movable supporting member 10 through the front-side springs 11,12 having the resilient portions 11D, 11E, 12D, 12E, and at its rear side by a rear portion of the movable supporting member 10 through the rear-side spring 13 having the resilient portion 13C. In this way, the lens frame 2 is resiliently supported by the movable supporting member 10 against the driving in the directions of the optical axis.

The base supporting member 15 is placed at rear side of the lens frame 2 and the movable supporting member 10, and has a bottom plate 15B with a central opening 15A through which the light from the lens is allowed to pass. In the example shown in the drawings, the base supporting member 15 has a rectangular shape with corners surrounding the optical axis, as well as the movable supporting member 10, and has wire retaining portions 15C on these corners.

Each of the supporting wires 14(14A, 14B, 14C, 14D) possesses resiliency to resist to flexing, and stands along the optical axis with its rear end retained by the associated wire retaining portion 15C of the base support member 15. The front end of each of the support wires 14A, 14B, 14C, 14D is mounted on the corresponding outer mounting part 11A, 12A, 11B, 12B of the front-side springs 11,12 attached to the movable supporting member 10, whereby the movable supporting member 10 that resiliently supports the lens frame 2 is hung by the supporting wires 14 in a suspended state. In this way, the lens frame 2 is resiliently supported against the driving in directions intersecting the optical axis, by virtue of resilient flexing of the supporting wires 14.

The base supporting member 15 has external connection terminals 15F. The base supporting member 15 also has a circuit provided on the bottom plate 15B and connected to the external connection terminals 15F, thus constituting a power feeding terminal section for feeding power to the driving unit 4. Among the independent external connection terminals 15F, selected terminals are connected, through the circuit on the bottom plate 15B, to both ends of the image stabilization correction coils 22(22A, 22B) which are supported by coil supporting portions 15D of the base support member 15. These selected external connection terminals 15F serve as power supply terminals for the image stabilization correction coils 22.

In addition, other selected external connection terminals 15F are connected to both ends of the focus coil 20 through the circuit on the bottom plate 15B and via the supporting wires 14A, 14B which are retained by the wire retaining portions 15C and further via the front-side springs 11, 12. These other selected external connection terminals 15F constitute a power supply terminal for the focus coil 20.

Furthermore, still other selected external connection terminals 15F are connected to the position detection sensors 6(6A,6B) which are supported by sensor supporting portions 15E of the base supporting member 15, via the circuit on the bottom plate 15B. These still other external connection terminals 15F serve as input/output terminals of position detection sensors 6(6A, 6B).

In the illustrated example of the invention, the power supply to the focus coil 20 and the power supply to the image stabilization correction coils 22 are controlled independently of each other, so that the focusing control of the lens flame 2 and the image stabilization correction control of the lens flame 2 can be carried out separately and independently.

In this regard, a feedback control is performed for image stabilization, by detection signals from the position detection sensors 6(6A, 6B). A filter frame F is mounted on the rear side of the base supporting member 15, and an image sensor not shown in the drawings is mounted on the rear side of the filter frame F. Also, a protection frame 5 having a central opening 5A is mounted on the base supporting member 15 so as to surround the periphery of the movable supporting member 10.

Figure 3:
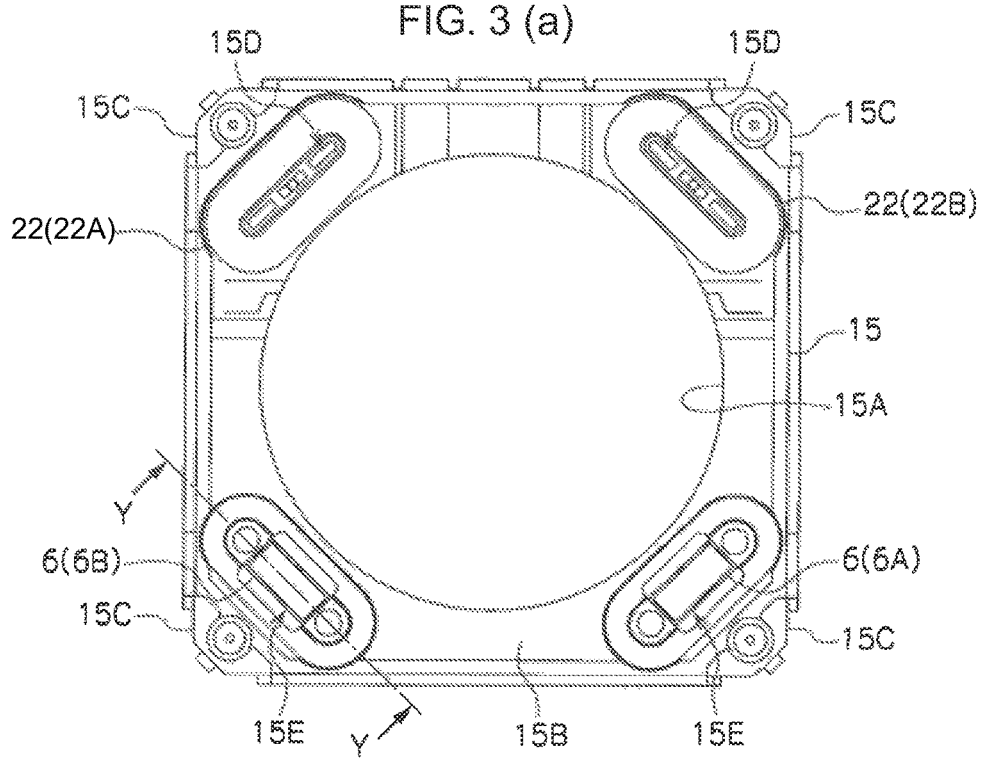
Figure 3:
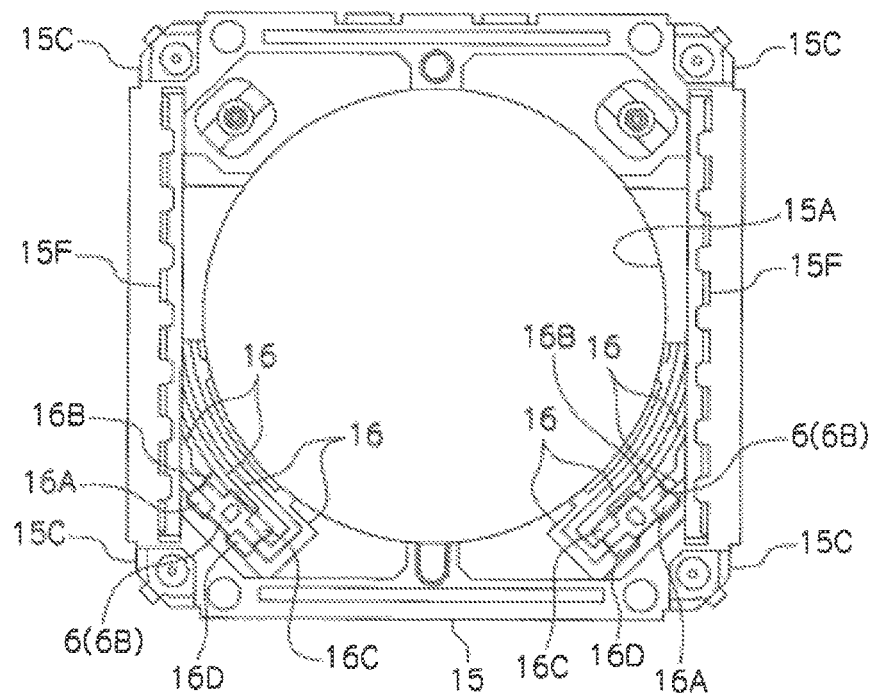
Figure 4:
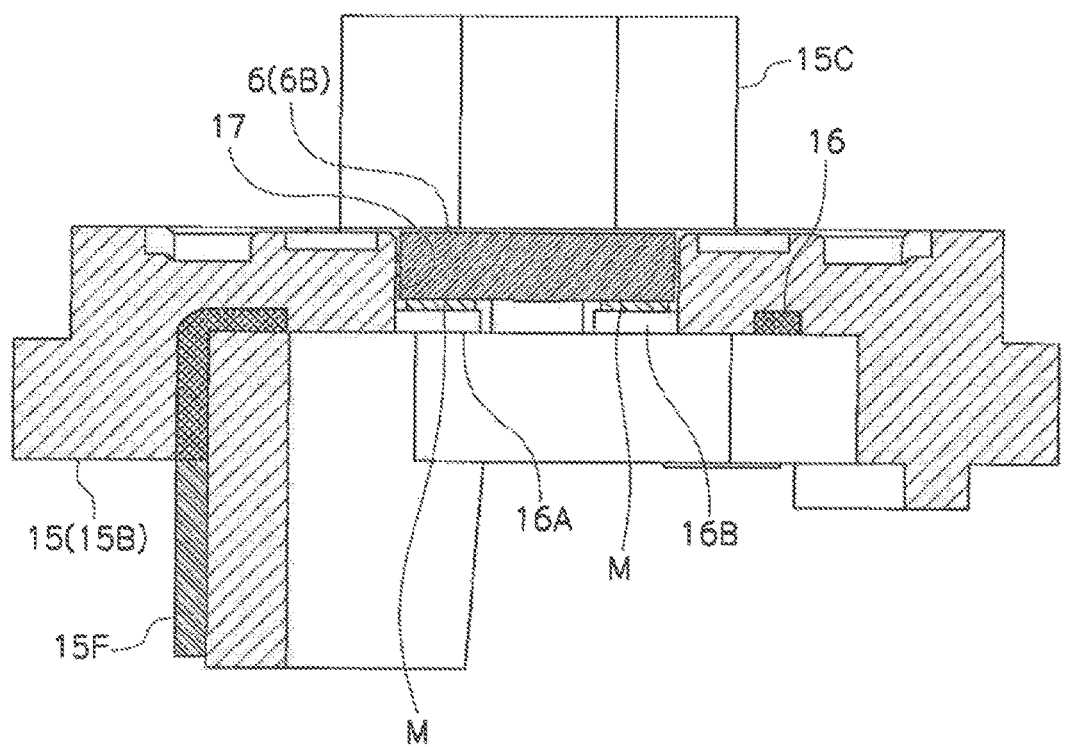
FIG. 4 is a view of the base support member of the lens driving device according to the example of the present invention (sectional view taken along line Y-Y of FIG. 3(a)).

FIGS. 3 and 4 are views of the base supporting member 15 of the lens driving device according to the example of the present invention. FIG. 3(*a*) is a plan view, while FIG. 3(*b*) is a rear view, FIG. 4 is a sectional view taken along line Y-Y of FIG. 3(*a*). The base supporting member 15 supports the position detection sensors 6(6A, 6B) for detecting the position of the lens frame 2, while supporting the image stabilization correction coils 22. The position detection sensors 6A, 6B arranged in a pair can be constituted by hall sensors that detect magnetic fields of the magnets 21 which also are arranged in a pair and held by the movable supporting member 10 that supports lens frame 2. The position detection sensors 6A, 6B detect the position of the lens frame 2 in directions (X, Y directions) intersecting the optical axis, by detecting the magnetic fields of the magnets 21. By controlling the power supply to the image stabilization correction coils 22 based on the outputs from the position detection sensors 6A, 6B, a feedback control for image stabilization can be carried out.

The front surface of the bottom plate 15B of the base supporting plate 15 has supporting portions 15D for supporting the image stabilization correction coils 22(22A, 22B), and has sensor supporting portions 15E for supporting the position detection sensors 6(6A, 6B). Each sensor supporting portion 15E has a recess 17 for receiving associated one of the position detection sensors 6(6A, 6B). Also, the base supporting member 15 has the aforementioned circuit 16 integrally therewith, for connection to the position detection sensors 6(6A, 6B). This circuit 16 may be a lead frame (metal lines) integrally formed on the base supporting member 15 made of a resin, or a circuit integrally formed on the surface of the base supporting member 15 made of a resin, by MID (Molded Interconnect Device: molded circuit parts) technology, by printing, plating, or the like technique.

Terminals 16A, 16B, 16C, and 16D of the circuit 16 are exposed to the interior of the recesses 17 which receive the position detection sensors 6(6A, 6B). In case that the position detection sensors 6(6A,6B) are hall sensors, these terminals 16A, 16B, 16C, 16D are four terminals including + and − terminals for the respective sensors. The position detection sensors 6(6A, 6B) received in the recesses 17 are directly connected to the terminals 16A, 16B, 16C, 16D exposed in the recesses 17 by means of a connecting material M (for example, solder, conductive adhesive, welding, etc.). As shown in FIG. 4, preferably, the depth of the recesses 17 is equal to or greater than the height of the detection sensors 6(6A, 6B) received in the recesses 17. Therefore, the position detection sensors 6(6A, 6B) do not protrude from the surface of the base supporting member 15, allowing the lens frame 2 to be positioned more closely to the base support member 15.

In the illustrated example, the position detection sensors 6 are sensors for detecting the position of the lens frame 2 in directions intersecting the optical axis. However, the present invention is not limited to this example, and the present invention includes any examples in which the position detection sensors 6 detect the position of lens frame 2 in the directions of the optical axis. In such examples, the magnets are fixed to the lens frame 2, while the coils are fixed to the supporting unit that supports the lens frame 2, so that the lens frame 2 is driven in the direction of the optical axis. The supporting unit is provided with the aforementioned circuit 16, terminals 16A, 16B, 16C, 16D and the recesses 17, and the position detection sensors 6 are received in corresponding recesses 17 so that the terminals 16A, 16B, 16C, 16D are connected to the position sensors 6.

In the described lens driving device 1, the position sensors 6 for the feedback control of driving of the lens frame 2 are directly mounted on the supporting unit 3 that supports the lens frame 2. This eliminates the necessity of the flexible substrate for mounting, the position detection sensors 6, allowing easier mounting of the position detection sensors 6 and, therefore, reduction in the cost and positional deviation. Also, as the position detection sensors 6 are received in the recesses 17 formed in the supporting unit 3 (base supporting member 15), the position detection sensors 6 can easily and highly accurately be located at destined setting positions on the supporting unit 3. Therefore, the position of the lens frame 2 can be detected with enhanced accuracy.

Also, as the position detection sensors 6 are mounted directly on the supporting unit 3, the distance between the position detection sensors 6 and the detection objects (magnets etc.) on the lens frame 2 can be controlled easily and highly accurately.

Enhancement of detection accuracy for the position of the lens frame 2 is achieved also by this arrangement. Furthermore, as it is not necessary to take the thickness of the flexible substrate into account, and, as the position detection sensors 6 are received in the recesses 17 so as not to protrude from the supporting unit 3, the lens frame 2 can be positioned more closely to the supporting unit 3, a reduction in the size and/or the thickness of the lens driving device 1 can be accomplished. Also, a cost reduction is enabled by not using the costly flexible substrate.

Figure 5:
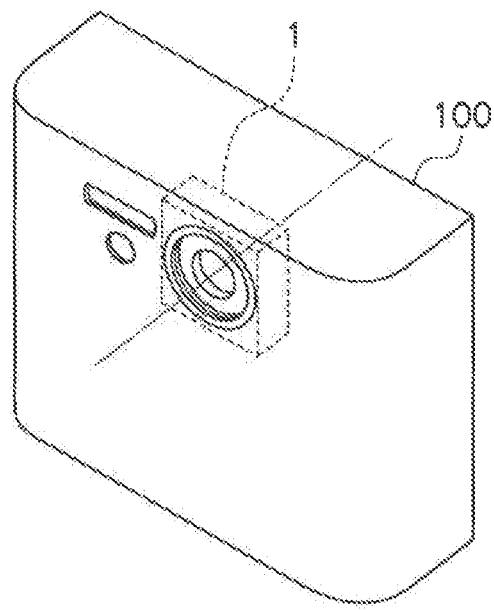
Figure 5:
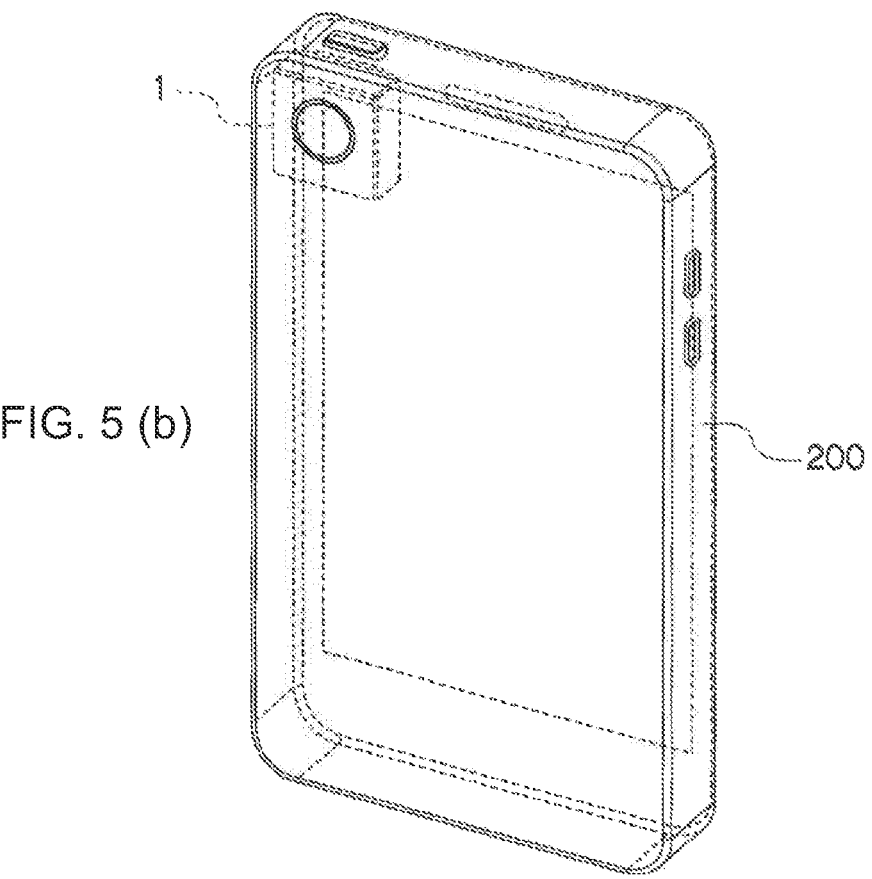

FIG. 5 shows an electronic device including the lens driving device 1 according to the example of the present invention. High autofocus performance and/or high image stabilization performance can be achieved, while a miniaturization is accomplished, when a camera shown in FIG. 5(a) incorporates the lens driving device 1 according to the example of the present invention. The lens driving device 1 can also be installed in a personal digital assistant 200 (including mobile phones, smartphones, etc.) shown FIG. 5(b), achieving a reduction in the thickness of such a device, as well as enhancement of the camera functions and saving of the space.

Although the examples of the present invention have been described with reference to the drawings, specific configurations are not limited to these examples, and a design modification and so forth without departing from the subject matter of the present invention should be also included in the scope of the present invention. In addition, the examples described above may be combined each other by mutually sharing the techniques as long as there is neither contradiction nor problem in the purpose, configuration and so forth.

The invention claimed is:

1. A lens driving device, comprising:
  a lens frame;
  a supporting unit that supports the lens frame in driving directions;
  a driving unit that drives the lens frame in one or both of a direction of an optical axis and a direction intersecting the optical axis; and
  a sensor that is mounted on the supporting unit and detects a position of the lens frame,
  wherein the supporting unit comprises:
    a circuit that is connectable to the sensor and integrally formed with the supporting unit via insert molding; and
    a recess that receives the sensor, and
    wherein the circuit has terminals exposed to a space inside the recess.

2. The lens driving device of claim 1, wherein the recess locates the sensor; and
  the supporting unit comprises a base supporting member which comprises integrally formed circuit.

3. The lens driving device of claim 1, wherein the supporting unit includes:
  a movable supporting member that resiliently supports the lens frame against driving in the direction of the optical axis; and a base supporting member that resiliently supports the movable supporting member against the driving in the direction intersecting the optical axis, wherein the recess is provided in the base supporting member.

4. The lens driving device of claim 3, wherein the sensor comprises a Hall effect sensor that detects magnetic field of a magnet that is a part of the driving unit and provided with the movable supporting member.

5. A camera comprising:

a lens driving device including:
- a lens frame;
- a supporting unit that supports the lens frame in driving directions;
- a driving unit that drives the lens frame in one or both of a direction of an optical axis and a direction intersecting the optical axis; and
- a sensor that is mounted on the supporting unit and detects a position of the lens frame,
  wherein the supporting unit comprises:
    - a circuit that is connectable to the sensor and integrally formed with the supporting unit via insert molding; and
    - a recess that receives the sensor, and
    - wherein the circuit has terminals exposed to a space inside the recess.

6. An electronic device comprising:

a lens driving device including:
- a lens frame;
- a supporting unit that supports the lens frame in driving directions;
- a driving unit that drives the lens frame in one or both of a direction of an optical axis and a direction intersecting the optical axis; and
- a sensor that is mounted on the supporting unit and detects a position of the lens frame,
  wherein the supporting unit comprises:
    - a circuit that is connectable to the sensor and integrally formed with the supporting unit via insert molding; and
    - a recess that receives the sensor, and
    - wherein the circuit has terminals exposed to a space inside the recess.

7. A method of manufacturing a lens driving device, comprising:

a step of assembling:
- a lens frame;
- a supporting unit that supports the lens frame in driving directions;
- a driving unit that drives the lens frame in one or both of a direction of an optical axis and a direction intersecting the optical axis; and
- a sensor that is mounted on the supporting unit and detects a position of the lens frame,
  wherein the supporting unit comprises:
    - a circuit that is connectable to the sensor and integrally formed with the supporting unit via insert molding; and
    - a recess that receives the sensor, and
    - wherein the circuit has terminals exposed to a space inside the recess.

* * * * *